United States Patent
Alkhazov et al.

[11] Patent Number: 5,603,913
[45] Date of Patent: Feb. 18, 1997

[54] CATALYSTS AND PROCESS FOR SELECTIVE OXIDATION OF HYDROGEN SULFIDE TO ELEMENTAL SULFUR

[75] Inventors: Tofik G. O. Alkhazov, Baku, U.S.S.R.; Roland E. Meissner, III, La Canada, Calif.

[73] Assignee: Azerbaidzhanskaya Gosudarstvennaya Neftianaya Academiya, Baku, U.S.S.R.

[21] Appl. No.: 443,252

[22] Filed: May 17, 1995

[51] Int. Cl.$^6$ .................................................. C01B 17/16
[52] U.S. Cl. .................................... 423/576.8; 423/573.1; 423/230; 423/231; 208/212
[58] Field of Search .................................... 423/230, 231, 423/573.1, 576.8; 208/212

[56] References Cited

U.S. PATENT DOCUMENTS

| | | |
|---|---|---|
| 4,088,736 | 5/1978 | Courty et al. . |
| 4,192,857 | 3/1980 | Tellier et al. . |
| 4,233,276 | 11/1980 | D'Souza et al. . |
| 4,311,683 | 1/1982 | Hass et al. ................................ 423/573 |
| 4,313,820 | 2/1982 | Farha, Jr. et al. ....................... 208/213 |
| 4,363,790 | 12/1982 | Anderson et al. . |
| 4,371,507 | 2/1983 | Farha, Jr. et al. . |
| 4,371,728 | 2/1983 | Farha, Jr. et al. . |
| 4,427,576 | 1/1984 | Dupin ........................................ 502/218 |
| 4,519,992 | 5/1985 | Alkhazov et al. . |
| 4,544,534 | 10/1985 | Dupin et al. . |
| 4,550,098 | 10/1985 | Gens .......................................... 502/324 |
| 4,576,925 | 3/1986 | Alkhazov et al. . |
| 4,629,612 | 12/1986 | van der Wal et al. ................... 423/244 |
| 4,690,806 | 9/1987 | Schorfheide . |
| 4,722,799 | 2/1988 | Ashbrook et al. ....................... 210/722 |
| 4,732,888 | 3/1988 | Jha et al. . |
| 4,818,740 | 4/1989 | Berben et al. . |
| 4,871,521 | 10/1989 | Pendergraft ............................. 423/230 |
| 4,886,649 | 12/1989 | Ismagilov et al. . |
| 5,037,629 | 8/1991 | Berben et al. . |
| 5,244,641 | 9/1993 | Khare ....................................... 423/220 |
| 5,286,697 | 2/1994 | van den Brink et al. . |
| 5,366,717 | 11/1994 | Dorchak et al. ........................ 423/570 |
| 5,514,351 | 5/1996 | Buchanan et al. ....................... 423/220 |

FOREIGN PATENT DOCUMENTS

| | | | |
|---|---|---|---|
| 0293688 | 12/1988 | European Pat. Off. ............... 423/231 |
| 9230618 | 12/1984 | Japan .................................... 423/231 |
| 11871813 | 10/1981 | Russian Federation . |
| 11967551 | 10/1982 | Russian Federation . |
| 146141 | 6/1920 | United Kingdom ................ 423/576.8 |
| 1273738 | 5/1972 | United Kingdom ................ 423/231 |
| 2152489 | 8/1985 | United Kingdom . |
| 2164867 | 4/1986 | United Kingdom . |

*Primary Examiner*—Asok Pal
*Assistant Examiner*—Bekir L. Yildirim
*Attorney, Agent, or Firm*—Jeffrey G. Sheldon; Sheldon & Mak, Inc.

[57] ABSTRACT

A solid, porous catalyst for the selective oxidation of hydrogen sulfide to sulfur has the atomic proportions covered by the formula $Fe_A Mg_B Zn_C Cr_D$ wherein A has a value of 0.5 to 10, B has a value of 0.1 to 1, C has a value of 0 to 1, and D has a value of 0 to 1, where B+C=1. The catalyst is used by passing a gas stream comprising hydrogen sulfide and oxygen over the catalyst at a temperature above the dew point of sulfur and up to no more than 300° C.

12 Claims, No Drawings

CATALYSTS AND PROCESS FOR SELECTIVE OXIDATION OF HYDROGEN SULFIDE TO ELEMENTAL SULFUR

CROSS-REFERENCES

The present application is related to U.S. patent application Ser. No. 08/449,812, filed on the same date as this application is filed, and entitled "PROCESS FOR SELECTIVE OXIDATION OF HYDROGEN SULFIDE TO ELEMENTAL SULFUR USING IRON-ZINC CATALYSTS".

BACKGROUND

The claimed invention relates to novel catalysts for use in processes for the selective oxidation of hydrogen sulfide to form elemental sulfur.

As is known, many gases, both natural and industry generated, contain hydrogen sulfide ($H_2S$). For example, the $H_2S$ content of natural hydrocarbon gases can be up to 25%. Hydrotreater gases, synthesis gases from coal gasification, and the like also contain $H_2S$. It is very important to convert the $H_2S$ into sulfur for many reasons.

One reason is that the presence of hydrogen sulfide in a gas, even in very small quantities, decreases the value of the gas, often making the gas valueless. This is because $H_2S$ has a noxious smell, is highly corrosive, is an extremely strong poison for most living things, including humans, and is a poison for many catalysts.

Hydrogen sulfide conversion into elemental sulfur ($S_x$) can be carried out by two different principle methods:

(a) Decomposition, according to reaction:

$$H_2S \rightarrow H_2 + 1/x\, S_x \quad (1)$$

(b) Oxidation, according to reactions:

$$H_2S + \tfrac{1}{2} O_2 \rightarrow H_2O + 1/x\, S_x \quad (2)$$

$$H_2S + \tfrac{1}{2} SO_2 \rightarrow H_2O + 3/2x\, S_x \quad (3)$$

In the second method, in addition to $O_2$ and $SO_2$, other oxidants can be used, such as $H_2O_2$, $NO_x$, and the like.

From a practical point of view, the most attractive way of sulfur production from hydrogen sulfide is selective oxidation by using oxygen from air, according to reaction:

$$H_2S + \tfrac{1}{2} O_2 \rightarrow H_2O + 1/x\, S_x \quad (4)$$

Reaction (4) is thermodynamically possible over a very wide range of industrially acceptable temperatures. Without a catalyst, however, the rate of reaction is low and the reaction is noticeable only at temperatures higher than 300° C. However, reaction (4) is accompanied by conversion of $H_2S$ to sulfur dioxide at temperatures greater than about 300° C. by the reactions:

$$H_2S + \tfrac{3}{2} O_2 \rightarrow H_2O + SO_2 \quad (5)$$

$$1/x\, S_x + O_2 \rightarrow SO_2 \quad (6)$$

Further, sulfur dioxide can form according to the reverse Claus reaction:

$$3/2x\, S_x + H_2O \rightarrow H_2S + \tfrac{1}{2} SO_2 \quad (7)$$

Thus, in order to selectively form elemental sulfur, $H_2S$ oxidation should be conducted at temperatures less than about 300° C. However, this is only possible by the use of suitable catalyst. A preferred catalyst should not promote the reverse Claus reaction (reaction (7)) to minimize the formation of $SO_2$. If a solid catalyst is used, the process temperature should be at least 180° C., in order to prevent condensation of formed sulfur on the catalyst. Condensed sulfur blocks the catalyst surface, thereby reducing $H_2S$ oxidation rate.

In sum, to carry out oxidation of selective $H_2S$ to S, catalysts showing high activity at temperatures 180°–300° C. are required. In addition to high activity, it is desirable that the catalysts possess high selectivity, because in the reaction medium, which contains $H_2S$ and $O_2$, in addition to undesirable side reactions (5) to (7) above, other undesirable side reactions which decrease $H_2S$ conversion into S are thermodynamically possible. These other undesirable side reactions include:

$$H_2S + 2O_2 \rightarrow H_2O + SO_3 \quad (8)$$

$$1/x\, S_x + \tfrac{3}{2} O_2 \rightarrow SO_3 \quad (9)$$

These reactions usually take place only at temperatures higher than about 400° C.

For achievement of highly selective oxidation of $H_2S$ into $S_x$ by use of a solid catalyst, preferably the catalyst contains as few small pores and as many large pores as possible. This structure allows molecules of formed sulfur to leave catalysts pores rapidly and thereby avoid reactions (6) and (7). Since a catalyst's surface is generally made up of its pores, catalysts with large pores usually do not have a large specific surface since specific surface is inversely proportional to pore diameter.

Different methods for preparing catalysts with large pores and accordingly small specific surface are known in heterogeneous catalysis. For example, USSR Inventors Certificate 871813 (1981) (which is incorporated herein by reference) discloses an iron oxide based catalyst having specific surface 1–2 $m^2/g$ and average pore diameter 2500–2900 Å for use as a $H_2S$ oxidation catalyst. USSR Inventors Certificate 967551 (1982) (which is incorporated herein by reference) also discloses a catalyst in which an active compound is applied on an inert carrier having a specific surface of 1.5–2.0 $m^2/g$ and an average pore diameter of 2500–3000 Å. U.S. Pat. Nos. 4,818,740 and 5,037,629 disclose catalysts prepared by depositing oxides of iron or oxides of iron and chromium on carriers having large pores and small specific surface for the selective oxidation of $H_2S$ to S.

The pore structure of a catalyst allows the active components of the catalyst to perform effectively. The catalyst pore structure however, by itself, cannot provide high activity and selectivity. These are effected by the chemical and phase composition of the catalyst. Thus, to provide an effective catalyst, chemical and phase composition must be optimized.

However, the level of knowledge of chemistry and catalysis does not allow the prediction of a catalyst composition for a given reaction.

Analysis of periodical and patent literature, reveals that oxides of iron, aluminum, vanadium, titanium, and other metals have been suggested for selective oxidation of $H_2S$ to S. Such oxides display catalytic activity for $H_2S$ oxidation, but they have not found wide application in selective oxidation processes because of their disadvantages. Iron oxide as a catalyst for $H_2S$ oxidation was suggested by Claus about 100 years ago. However, the form of oxides proposed by Claus did not achieve high selectivity. In USSR Inventors Certificate 871873 iron oxide with small specific surface, reduced by calcination at a high temperature to turn $Fe_2O_3$ to $Fe_3O_4$, is disclosed as being more selective than the iron oxide used by Claus. Use of a catalyst containing iron oxide is described in U.S. Pat. Nos. 4,576,925 and 4,519,992, as well as U.K. Patents Nos. 2,164,867A and 2,152,489A, all of which are incorporated herein by reference.

Aluminum oxide ($Al_2O_3$) is also mentioned as a catalyst for $H_2S$ oxidation, but has the disadvantage that it is catalytically active in the reverse Claus reaction (7). In addition, it is not stable and can lose its activity quickly because of surface sulfation.

Vanadium oxide, which is used in catalyst compositions for the Selectox process described in U.S. Pat. No. 4,311,683, has the disadvantage that it is very active for reactions (6) and (7), and therefore does not have a high selectivity for $H_2S$ conversion to S.

Titanium oxide as a catalyst for $H_2S$ oxidation to S has also been suggested. However, this oxide is catalytically active not only in reaction (4), but also for reaction (7). Thus, it can be used for selective oxidation of $H_2S$ by oxygen only for low water content reaction mixtures.

Heterogeneous catalysts containing iron and chromium oxides for $H_2S$ oxidation to S have been described, for example, in U.S. Pat. Nos. 4,818,740 and 4,576,925. More complex catalysts comprising three or more metal oxides have been described, for example, in UK Patent No. 2164867A. In addition to iron and chromium oxides, one of several oxides of the following metals were added in a quantity of 1.5–25% by weight: cobalt, nickel, manganese, copper, zinc and titanium. Although the addition of zinc and titanium oxide can improve the properties of an iron oxide based catalyst, nevertheless these catalysts display noticeable activity in the reverse Claus reaction and in the oxidation of sulfur to $SO_2$.

Accordingly, there is a need for a highly efficient and highly selective catalyst that is effective in converting hydrogen sulfide to sulfur at temperatures above the sulfur dew point to about 300° C.

SUMMARY

The present invention is directed to a process for the selective oxidation of hydrogen sulfide to sulfur at a temperature above the sulfur dew point up to about 300° C., i.e., no more than about 300° C. In the process, a gas stream comprising hydrogen sulfide and oxygen, preferably from air, is passed over a solid porous catalyst. The catalyst is formed of (a) iron, (b) magnesium, (c) zinc, and optionally chromium. The catalyst has the atomic proportions covered by the formula $Fe_AMg_BZn_CCr_D$ wherein A has a value of 0.5 to 10, preferably 1 to 5, B has a value of 0.1 to 1, C has a value of 0 to 1, D has a value of 0 to 1, and B+C=1. Preferably, D is no more than 0.3, and most preferably, the catalyst contains no chromium for environmental reasons, i.e., D=0.

Preferred catalysts are catalysts having the formula $(MgO)_xFe_2O_3$ where x is from 0.5 to 2. Other preferred catalysts are those in which magnesium is partially replaced by zinc and/or iron is partially replaced by chromium.

An exemplary catalyst contains iron and magnesium in an atomic ratio of Fe:Mg of 1:0.25 to 1:1, such as a ratio of 2:1 or 4:1. Another exemplary catalyst contains iron, zinc, and magnesium, which can be in the atomic ratio of 8:1:1. Another exemplary catalyst contains iron, magnesium, zinc, and chromium, which can be present in an atomic ratio of 2:1:1:2.

The present invention is directed not only to the process of using the catalyst, but the catalyst itself.

DESCRIPTION

We have discovered that the catalytic properties of a metal oxide system for the selective oxidation of $H_2S$ to S, where the metal system comprises the oxides of iron (and optionally chromium), can be significantly improved by introducing the oxides of magnesium, and optionally zinc. Without being bound by theory, it is believed that the improvement occurs due to interaction of these oxides in a catalyst's composition, which results in formation of simple and complex spinels (ferrites and chromites). In such a system, the spinels $MgCr_2O_4$ and $MgFe_2O_4$ are formed at temperatures higher than 400° C. Ions with same valence, which are part of these spinels, have very close radiuses, namely:

| | |
|---|---|
| $Mg^{2+}$ = 0.066 nm | $Fe^{3+}$ = 0.064 nm |
| $Zn^{2+}$ = 0.074 nm | $Cr^{3+}$ = 0.063 nm |
| $Fe^{2+}$ = 0.074 nm | | and the spinels have the same dimensions of the lattice:

| |
|---|
| $MgCr_2O_4$ = 0.835 nm |
| $MgFe_2O_4$ = 0.840 nm |
| $ZnCr_2O_4$ = 0.831 nm |
| $ZnFe_2O_4$ = 0.840 nm |
| $FeFe_2O_4$ = 0.840 nm |

The formation of simple and complex spinels in a system affects catalyst properties, and catalysts which contain simple and complex ferrites of magnesium and optionally zinc possess high activity for the selective oxidation of hydrogen sulfide to elemental sulfur.

Replacing a part of trivalent iron by trivalent chrome increases catalyst thermal stability and slightly suppresses the iron activity in side reactions.

The catalyst of the present invention can be prepared by many procedures, using different initial compounds, containing the above stated metals. Conditions are chosen so that magnesium ferrites, and optionally zinc ferrites, can be easily achieved by calcination of intermediates during the last stage of catalyst preparation at temperatures from about 600° C. to about 1000° C. Several hours are enough. Higher temperatures and very long calcination can result in catalyst sintering.

The catalysts of this invention are normally prepared by forming an aqueous solution of soluble salts of the metals to be combined. A base is added to cause precipitation of the salts in the hydroxide form. The precipitate is then partially dried and formed into desirable catalyst shape and converted to the corresponding oxides by calcination. Calcination normally occurs with the temperatures from 600° to 1000° C. The formed catalysts preferably have a surface area of about 1 to 5 m²/g with at least 90% of pore diameters being greater than about 500 Å. Pores are attributed to the lattice work of the formed oxides. Preferably, deposition onto a carrier is not resorted to so that the entire catalyst is made up of the catalytically active metals. However, a carrier can be used, such as described in USSR Inventors Certificate 871,813.

When used for the oxidation of hydrogen sulfide, catalyst is employed at a temperature above the condensation temperature of sulfur, typically greater than about 180° C., up to a temperature of about 300° C. Selective oxidation occurs by passing a gas stream comprising hydrogen sulfide and oxygen, normally provided from air, over the catalyst at a space velocity of 1000 to 6000 $hr^{-1}$ or more. The feed gas typically contains at least 0.1%, by volume, $H_2S$ and no more than about 50%, by volume, $H_2S$. The temperature preferably is maintained below about 300° C. to ensure that conversion of hydrogen sulfide to sulfur is maximized. An inert gas coolant such as nitrogen can be used. In all instances it has been observed that the level of hydrogen sulfide conversion is in excess of about 95 percent with approximately 92 to 96 percent of the sulfur in $H_2S$ present in a gas selectively converted to elemental sulfur.

Substantially any gas containing $H_2S$ can be treated using this process. For example, a process according to this invention can be applied to direct conversion of hydrogen sulfide to elemental sulfur, used in the last catalytic stages of a Claus Unit, or used to process tail gas streams discharged from a Claus plant to convert residual hydrogen sulfide in such gas streams, after all of the sulfur has been hydrogenated to hydrogen sulfide, to elemental sulfur. The process can also be used to treat a primary gas from an amine unit.

Examples of catalyst preparation used in a selective oxidation process are shown below:

EXAMPLE 1

Iron and magnesium chloride salts were dissolved in distilled water in quantities to provide a 1 molar solution. The iron and magnesium hydroxides were coprecipitated by adding aqueous solution of ammonia (10% $NH_3$ in water). Iron hydroxide precipitation occurred at a pH of 3–4, and magnesium hydroxide at a pH of 10–11. The precipitated hydroxides were washed and air dried. The metal hydroxides were mixed in quantities in proportion to the atomic ratio of Mg:Fe=1:2. A paste was formed from the mixture. In order to obtain a paste of necessary consistency, it was either further dried, or water or an ammonia solution was added. Granules were formed using a screw extruder. The resultant extrudates were dried at 120°–140° C. and then calcined for 3–4 hours at a temperature of 850° C.

EXAMPLE 2

A catalyst was prepared as in Example 1 where the hydroxides were mixed in a ratio Mg:Fe of 1:4.

EXAMPLE 3

Nitrates of zinc, magnesium and iron were dissolved in water in quantities, to provide 0.5 mole zinc nitrate, 0.5 mole magnesium nitrate and 2 moles iron nitrate in 1 liter of solution. A 10% ammonia solution was added until the pH became 10–11. The precipitated hydroxide mixture was filtered, and washed with water till nitrate-ions were not observed in the precipitate. The mixture of hydroxides was thoroughly mixed, air-dried, and molded in a cylinder shape. The granules were dried at 140°–150° C., then calcined at 830° C. for 4 hours.

EXAMPLE 4

Zinc, magnesium and iron (II) chlorides were dissolved in water taking in concentrations to provide 0.5 mole zinc chloride, 0.5 mole magnesium chloride and 1.0 mole iron chloride per liter of solution. A 10%-water solution of KOH was added until the pH was 10–11. The precipitated hydroxides were filtered off and washed with water. Chrome oxide was added to this hydroxide mixture in a quantity corresponding to an atomic ratio Fe:Cr=1:1, and then the mixture was mixed thoroughly and calcined at 450° C. From the resultant precipitate a paste was prepared using ammonium hydroxide as a plasticizer. Granules with the following dimension: diameter 4 mm, length 4–6 mm were formed by screw-extruder, dried and then calcined at 930° C. for 3 hours.

EXAMPLE 5

Catalysts, prepared as described in Examples 1–4 were used for $H_2S$ oxidation. For this purpose, catalysts were loaded into a once-through reactor with electric furnace heating and a gas mixture, consisting of specified quantities of $H_2S$, $O_2$ and water vapor passed through the reactor. Nitrogen was used as a diluent. In order to examine the effect of individual gas mixture components different amounts of $H_2$, $CH_4$ and other saturated hydrocarbons, $CO_2$ and others are added. Gas was passed through the reactor at a space velocity of 3000–5000 per hr. $H_2S$ concentration was varied in a range of 1–3%, $H_2O$ vapor content varied in a range of 3–30% vol.

The results of catalyst activity determination are shown in Table 1. Tests were carried out at $O_2$:$H_2S$=0.6.

TABLE 1

| Example No. | Catalyst Composition, mol. % | | | | Process Condition | | | Total Conversion of $H_2S$ % | S Recovery % |
| | $Fe_2O_3$ | $Cr_2O_3$ | ZnO | Magnesium MgO | T°C. | Space Velocity $Hr^{-1}$ | $H_2S$ Concentration | | |
| --- | --- | --- | --- | --- | --- | --- | --- | --- | --- |
| 1 | 50 | — | — | 50 | 250 | 3000 | 3.0 | 96.4 | 94 |
| 1 | 50 | — | — | 50 | 270 | 5000 | 3.0 | 98.3 | 94 |
| 2 | 67 | — | — | 33 | 230 | 3000 | 2.0 | 97.3 | 94.1 |
| 2 | 67 | — | — | 33 | 250 | 5000 | 2.0 | 98.8 | 93.8 |
| 3 | 50 | — | 25 | 25 | 230 | 3000 | 3.0 | 97.1 | 95.0 |
| 3 | 50 | — | 25 | 25 | 250 | 3000 | 3.0 | 98.2 | 95.1 |
| 4 | 25 | 25 | 25 | 25 | 250 | 3000 | 2.0 | 97.3 | 94.6 |
| 4 | 25 | 25 | 25 | 25 | 270 | 5000 | 2.0 | 97.8 | 94.2 |

The addition of $H_2$, saturated hydrocarbons, or $CO_2$ to the reaction mixture had little effect on total conversion or sulfur recovery.

Although the present invention has been described in considerable detail with reference to certain preferred versions thereof, other versions are possible. Therefore, the scope of the appended claims should not be limited to the description of the preferred versions contained herein.

What is claimed is:

1. A process for the selective oxidation of hydrogen sulfide to sulfur comprising passing a gas stream comprising hydrogen sulfide and oxygen at a temperature above the dew point of sulfur up to about 300° C. over a solid porous catalyst formed of oxides of iron and magnesium, and optionally a metal selected from the group consisting of zinc, chromium, and mixtures thereof, the catalyst having the atomic proportions covered by the formula $Fe_A Mg_B Zn_C Cr_D$ wherein A has a value of 0.5 to 10, B has a value of 0.1 to 1, C has a value of 0 to 1, and D has a value of 0 to 1, where B+C=1.

2. A process as claimed in claim 1 in which the catalyst comprises iron and magnesium in an atomic ratio of Fe:Mg of 1:0.25 to 1:1.

3. A process as claimed in claim 2 in which the catalyst comprises iron and magnesium in an atomic ratio of 2:1.

4. A process as claimed in claim 2 in which the catalyst comprises iron and magnesium in an atomic ratio of 4:1.

5. A process as claimed in claim 1 in which the catalyst comprises iron, zinc and magnesium.

6. A process as claimed in claim 5 in which the catalyst comprises iron, zinc and magnesium in an atomic ratio of 8:1:1.

7. A process as claimed in claim 1 in which the catalyst comprises iron, magnesium, zinc and chromium.

8. A process as claimed in claim 7 in which the catalyst comprises iron, magnesium, zinc and chromium in atomic ratio of 2:1:1:2.

9. A process as claimed in claim 5 in which the catalyst contains substantially no chromium.

10. The process of claim 1 wherein the catalyst consists essentially of oxides of iron and magnesium.

11. A process for the selective oxidation of hydrogen sulfide to sulfur comprising passing a gas stream comprising hydrogen sulfide and oxygen at a temperature above the dew point of sulfur up to about 300° C. over a solid porous catalyst formed of oxides of iron and magnesium, and optionally a metal selected from the group consisting of zinc, chromium, and mixtures thereof, the catalyst having the atomic proportions covered by the formula $Fe_A Mg_B Zn_C Cr_D$ wherein A has a value of 1 to 5, B has a value of 0.1 to 1, C has a value of 0 to 1, and D has a value of 0 to 1, where B+C=1.

12. The process of claim 11 wherein D has a value of 0 to 0.3.

* * * * *

UNITED STATES PATENT AND TRADEMARK OFFICE
CERTIFICATE OF CORRECTION

PATENT NO.   :   5,603,913

DATED        :   February 18, 1997

INVENTOR(S)  :   Alkhazov et al.

It is certified that error appears in the above-identified patent and that said Letters Patent is hereby corrected as shown below:

On the title page, Item [73] should read
--Parsons Process Group Inc.
  Pasadena, California --.

Signed and Sealed this

Nineteenth Day of May, 1998

Attest:

BRUCE LEHMAN

Attesting Officer        Commissioner of Patents and Trademarks